(12) United States Patent  
Yuen et al.

(10) Patent No.: US 9,904,146 B2  
(45) Date of Patent: Feb. 27, 2018

(54) CAMERA WITH POSITIONABLE LIGHT SHADE

(71) Applicant: GM Global Technology Operations LLC, Detroit, MI (US)

(72) Inventors: Ephraim C. Yuen, Markham (CA); Akram M. Abdel-Rahman, Pickering (CA); Shiv G. Patel, Brampton (CA)

(73) Assignee: gm global technology operations llc, Detroit, MI (US)

( * ) Notice: Subject to any disclaimer, the term of this patent is extended or adjusted under 35 U.S.C. 154(b) by 96 days.

(21) Appl. No.: 14/926,537

(22) Filed: Oct. 29, 2015

(65) Prior Publication Data

US 2017/0123293 A1    May 4, 2017

(51) Int. Cl.

| | |
|---|---|
| *G03B 11/04* | (2006.01) |
| *B60R 11/04* | (2006.01) |
| *H04N 5/225* | (2006.01) |
| *G03B 9/02* | (2006.01) |
| *H04N 5/235* | (2006.01) |

(52) U.S. Cl.  
CPC ............ *G03B 11/045* (2013.01); *B60R 11/04* (2013.01); *G03B 9/02* (2013.01); *H04N 5/2254* (2013.01); *H04N 5/2354* (2013.01)

(58) Field of Classification Search  
CPC ...... B60R 11/04; H04N 5/235; H04N 5/2351; H04N 5/2254; G03B 11/00; G03B 11/04; G03B 11/045  
See application file for complete search history.

(56) References Cited

U.S. PATENT DOCUMENTS

| | | | | | |
|---|---|---|---|---|---|
| 5,047,847 | A | * | 9/1991 | Toda ...................... | A61B 1/05 348/345 |
| 5,293,542 | A | * | 3/1994 | Ise ......................... | H04N 5/238 348/335 |
| 5,387,958 | A | * | 2/1995 | Pashley ................ | H04N 9/735 348/224.1 |
| 5,479,298 | A | * | 12/1995 | Yanagi ................... | G02B 5/22 359/233 |
| 5,523,811 | A | * | 6/1996 | Wada ...................... | B60R 1/00 348/118 |
| 5,847,756 | A | * | 12/1998 | Iura ..................... | H04N 5/2357 348/220.1 |
| 5,892,573 | A | * | 4/1999 | Takahashi ........... | G03F 7/70358 355/53 |
| 6,028,303 | A | * | 2/2000 | Suzuki ................ | G02B 27/281 250/225 |
| 6,771,315 | B1 | * | 8/2004 | Nanjo .................. | H04N 5/2254 348/335 |
| 6,952,314 | B2 | * | 10/2005 | Yanagi .................. | G02B 5/205 359/885 |
| 7,199,830 | B1 | * | 4/2007 | Tanaka ................... | G03B 7/08 348/362 |
| 7,245,325 | B2 | * | 7/2007 | Yamaguchi .......... | H04N 5/2254 348/363 |
| 7,365,791 | B2 | * | 4/2008 | Ikeda ................. | H04N 5/23232 348/361 |

(Continued)

*Primary Examiner* — Twyler Haskins  
*Assistant Examiner* — Akshay Trehan  
(74) *Attorney, Agent, or Firm* — Lorenz & Kopf, LLP

(57) ABSTRACT

A product may include a lens and a shade. A field of view may be defined through the lens. An actuator may selectively position the shade within the field of view.

5 Claims, 3 Drawing Sheets

(56) References Cited

U.S. PATENT DOCUMENTS

| | | | | |
|---|---|---|---|---|
| 7,901,732 B2* | 3/2011 | Yashima | G02B 5/205 | 427/164 |
| 7,936,989 B2* | 5/2011 | Shinohara | G03B 7/08 | 396/241 |
| 7,973,829 B2* | 7/2011 | Udagawa | H04N 5/2254 | 348/224.1 |
| 8,120,865 B2* | 2/2012 | Umezu | G02B 5/205 | 348/743 |
| 2004/0223075 A1* | 11/2004 | Furlan | H04N 5/2254 | 348/363 |
| 2004/0240068 A1* | 12/2004 | Namazue | G02B 5/205 | 359/589 |
| 2005/0117027 A1* | 6/2005 | Fukuhara | B60R 11/04 | 348/222.1 |
| 2005/0163501 A1* | 7/2005 | Miyakawa | G03B 9/04 | 396/450 |
| 2006/0266835 A1* | 11/2006 | Tanida | B60R 11/04 | 235/462.01 |
| 2007/0065135 A1* | 3/2007 | Takei | G03B 7/003 | 396/241 |
| 2007/0210604 A1* | 9/2007 | Lin | B60J 3/0204 | 296/97.2 |
| 2007/0242141 A1* | 10/2007 | Ciurea | G02B 5/205 | 348/239 |
| 2009/0212202 A1* | 8/2009 | Takahashi | G02B 5/04 | 250/227.2 |
| 2010/0094501 A1* | 4/2010 | Kwok | G02B 27/01 | 701/36 |
| 2011/0096165 A1* | 4/2011 | Zeng | B60J 3/0204 | 348/148 |
| 2012/0075510 A1* | 3/2012 | Sato | G02B 5/281 | 348/273 |
| 2012/0261551 A1* | 10/2012 | Rogers | G02B 3/14 | 250/208.1 |
| 2013/0027511 A1* | 1/2013 | Takemura | G06K 9/00798 | 348/42 |
| 2014/0009615 A1* | 1/2014 | Kiyohara | H04N 7/18 | 348/148 |
| 2014/0063049 A1* | 3/2014 | Armstrong-Muntner | G03B 9/00 | 345/619 |
| 2014/0168490 A1* | 6/2014 | Imamura | G03B 11/00 | 348/302 |
| 2015/0042818 A1* | 2/2015 | Wada | G03B 17/14 | 348/164 |
| 2015/0062416 A1* | 3/2015 | Vance | G03B 17/17 | 348/369 |
| 2015/0220793 A1* | 8/2015 | Kiyohara | G06K 9/00805 | 382/103 |
| 2015/0256729 A1* | 9/2015 | Wato | H04N 5/2252 | 348/311 |
| 2016/0023620 A1* | 1/2016 | Matori | B60R 11/04 | 348/148 |
| 2016/0096487 A1* | 4/2016 | Konevsky | H04N 5/238 | 348/148 |
| 2016/0173748 A1* | 6/2016 | Oba | H04N 5/2254 | 348/148 |
| 2016/0191899 A1* | 6/2016 | Ohsumi | G03B 11/045 | 348/46 |
| 2016/0375828 A1* | 12/2016 | Yun | B60S 1/54 | 701/48 |

* cited by examiner

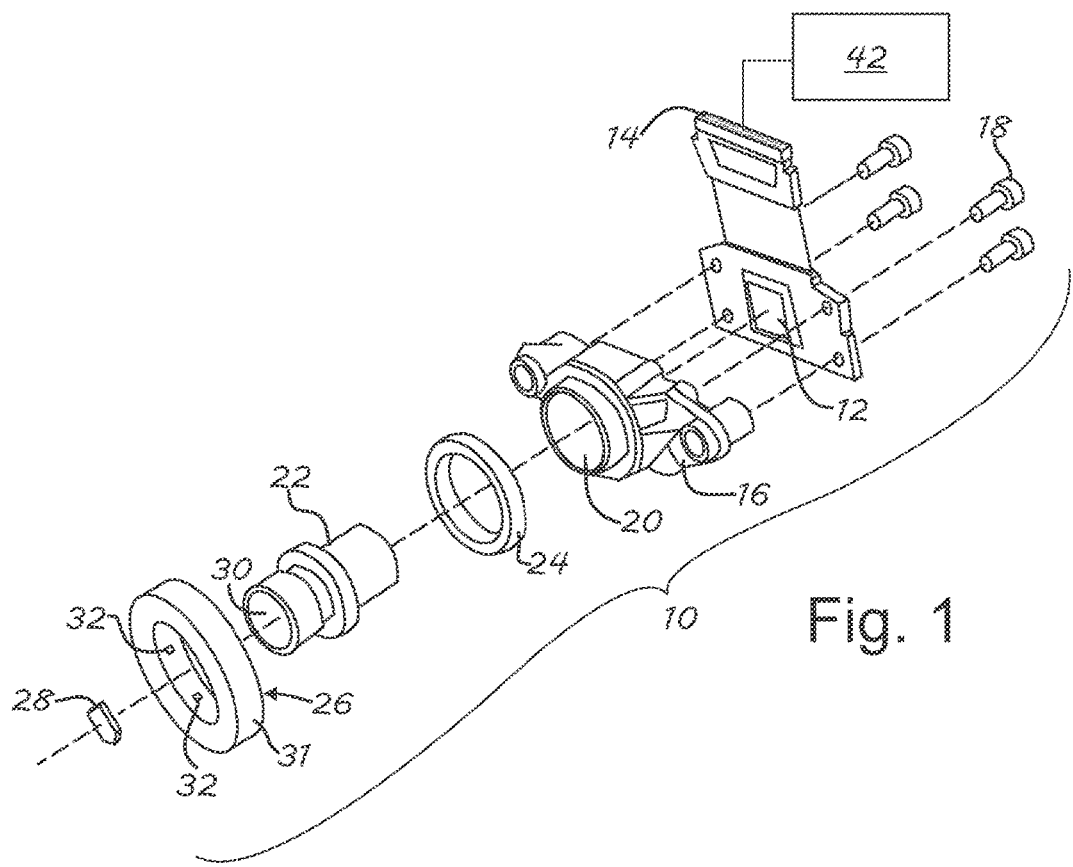
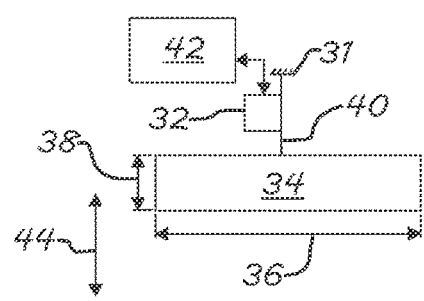
Fig. 2
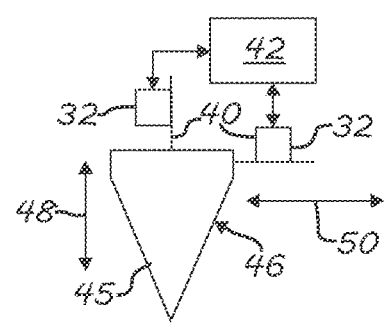
Fig. 3

US 9,904,146 B2

CAMERA WITH POSITIONABLE LIGHT SHADE

TECHNICAL FIELD

The field to which the disclosure generally relates includes cameras, and more particularly, includes cameras used on vehicles.

BACKGROUND

Cameras may be used in a variety of applications to capture images. Digital cameras receive light through a lens and may convert the incoming light rays to an electronic signal for display, evaluation or storage of the images defined by the light rays. When used outdoors, the incoming light rays may be subject to intense lights sources such as the sun or another bright light source. When the light entering through the camera lens includes that from such a source, the ability to discern details of the surroundings may be degraded. Incumbent camera systems may auto adjust their aperture to control light reaching the image sensor, and therefore lower the impact of the intense light source. However, this would dim the image as a whole and may result in filtering out image details that are of importance.

SUMMARY OF ILLUSTRATIVE VARIATIONS

A number of variations may involve a product that may include a lens and a shade. A field of view may be defined through the lens. An actuator may selectively position the shade within the field of view.

A number of additional variations may involve a product that may include an image sensor. A lens may capture light from a field of view. The light may be focused by the lens onto the image sensor. A shade may be positioned in a front of the lens and may selectively block a portion of the field of view.

A number of other variations may involve a method of blocking a light source from the field of view of a camera. A shade may be provided. The direction from which the light source is directed at the camera may be determined. The shade may be positioned within the field of view and in the direction.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates a product in exploded view according to a number of variations.

FIG. 2 illustrates a part of the product of FIG. 1 in schematic form according to a number of variations.

FIG. 3 illustrates a part of the product of FIG. 1 in schematic form according to a number of variations.

DETAILED DESCRIPTION OF ILLUSTRATIVE VARIATIONS

Figure 4:
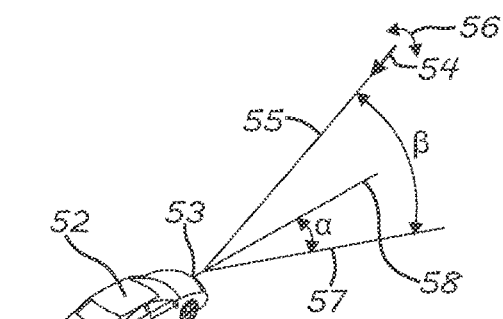
FIG. 4 illustrates a use of the product of FIG. 1 according to a number of variations.

The following description of the variations is merely illustrative in nature and is in no way intended to limit the scope of the invention, its application, or uses.

In a number of variations as illustrated in FIG. 1, a product 10 may include an image sensor 12. The product 10 may sense images for a variety of uses and may be referred to as a camera. The image sensor 12 may convert an optical image to an electronic signal, which may be communicated to a controller 42 through a connector 14. The image sensor 12 may use CMOS, CCD or other operating principles. The image sensor 12 may be connected to a mount 16, such as by a number of fasteners 18. The mount 18 may include an aperture 20 that aligns with the image sensor 12 and that may receive a lens 22, which may be an optical lens. The lens 22 may include single or multiple elements and may focus light onto the image sensor 12. A seal 24 may be provided adjacent the mount 18 to provide a weather tight assembly.

In a number of variations the product 10 may include an actuator mechanism 26 that may be connected with a shade 28, so that the shade 28 may be positionable over the front 30, which may be the light entering end, of the lens 22. The shade 28 may be opaque. In a number of variations the shade 28 may be semi-transparent, or may be treated so as to filter our certain spectrum ranges of light. The actuator mechanism 26 may operate on mechanical, electrostatic, thermal, shape memory alloy, pneumatic/hydraulic, piezoelectric, magnetic, chemical or other mechanisms that may effect selective movement of the shade 28. In a number of variations the actuator mechanism may include micro-electromechanical systems (MEMS), actuators that may operate on electrostatic, thermal, piezoelectric, magnetic, or other principles for effecting movement. The actuator mechanism 26 may be configured in the shape of a ring 31 disposed around the shade 28 and may include a number of individual actuators 32 assembled in the ring and connected with the shade 28.

With additional reference to FIG. 2, a shade usable as the shade 28 may be in the shape of a rectangle, designated as shade 34. The shade 34 may have a width 36 that may completely cover the width of the front 30 of the lens 22. The shade 34 may have a height 38 that may cover only a portion of the height of the front 30 of the lens 22. It should be appreciated that reference is made to width and height of the lens 22 but one skilled in the art would understand that those two dimensional orientations may be other two-dimensional orientations approximately perpendicular to one another. The shade 34 may be connected to one or more individual actuators 32 directly or through a link 40. The individual actuators 32 may be connected with the controller 42, which may receive information about the status of the individual actuators 32 and/or location of the shade 34 via one or more sensors (not shown), of a known type. The controller 42 may provide inputs to the individual actuators 32. In a number of variations the controller 42 may produce signals that may be delivered to each individual actuator 32 to effect bi-directional mechanical movement 44 of the shade 34. The bi-directional mechanical movement 44 may be described as one-dimensional in that it moves the shade 34 along a line to selectively cover a portion of the front 30 of the lens 22, and to selectively uncover that portion.

In operation, methods, algorithms, or parts thereof may be implemented in a computer program product of the controller 42 including instructions or calculations carried on a computer readable medium for use by one or more processors to implement one or more of the method steps or instructions. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program may be executed on one processor or on multiple processors in communication with one another.

In a number of variations, the program(s) may be embodied on computer readable media, which can include one or more storage devices, articles of manufacture, or the like. Illustrative computer readable media may include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium also may include computer to computer connections, for example, when data may be transferred or provided over a network or another communications connection (either wired, wireless, or a combination thereof). Any combination(s) of the above examples is also included within the scope of the computer-readable media. It is therefore to be understood that methods may be at least partially performed by any electronic articles and/or devices capable of executing instructions corresponding to one or more steps of the disclosed methods.

With additional reference to FIG. 3, a shade useable as the shade 28 may be, or may include a portion 45 in the shape of a triangle, and may be designated as shade 46. The shade 46 may have a width and a height that covers only a portion of the width and height of the front 30 of the lens 22. The shade 46 may be connected to one or more individual actuators 32 directly or through one or more links 40. The individual actuators 32 may be connected with the controller 42 that may receive information about the status of the individual actuators 32 and/or location of the shade 46 via one or more sensors (not shown), of a known type. The controller 42 may provide inputs to the individual actuators 32. In a number of variations the controller 42 may produce signals that may be delivered to each individual actuator 32 to effect dual bi-directional mechanical movement 48, 50 of the shade 46. The dual bi-directional mechanical movements 48, 50 may be described as two-dimensional in that the shade 46 may be moved within a plane to selectively cover a portion of the front 30 of the lens 22, and to selectively uncover that portion.

In a number of variations the product 10 may be a camera 53 mounted on a vehicle 52 as illustrated in FIG. 4. In the vehicle 52 the product 10 may be put to a variety of uses. As an example, in a lane keeping system the product 10 may be used to monitor road lane markings and may detect unintentional drifting out of a lane. If the camera 53 detects an impending unintentional drift, the system may use the steering system and the instrument cluster display to alert and/or aid the driver to stay in the lane. As another example, in an object detection system the product 10 may be used to detect stationary or moving objects around the vehicle 52 and may alert the driver and/or may control the vehicle autonomously to avoid the object. As a further example, in an adaptive cruise control system the product 10 may be used to detect a turn signal from a car ahead indicative of a lane change. Instead of slowing the vehicle 52, the system may advance the vehicle with the knowledge that the car in front is exiting the lane. In other systems the product 10 may capture images for any number of individual or combined purposes. In the uses of the product 10, intense light such as sunlight or bright light from other sources may saturate the image sensor 12 and may inhibit the extraction of desired image data. For example, a light source 54 may be directed at the vehicle 52 within an angular range 56 relative to the vehicle 52. The light source 54 may be directed at the vehicle 52 in the range 56 around a reference line 55 identified in space by the angle alpha ($\alpha$) and the angle beta ($\beta$). The angle $\alpha$ may be defined at the reference line 57 which is a horizontal line in the direction of the light source 54 and is laterally away from the horizontal centerline 58 of the lens 22 at a distance of a degrees. The angle $\beta$ may be measured upward from the reference line 57 to the reference line 55 which is directed at the oncoming light source 54. In a number of variations the dimensions of the shade 28, 34, 46 may be sufficient to obscure the known range 56 of the sun's rays around the reference line 55.

Figure 5:
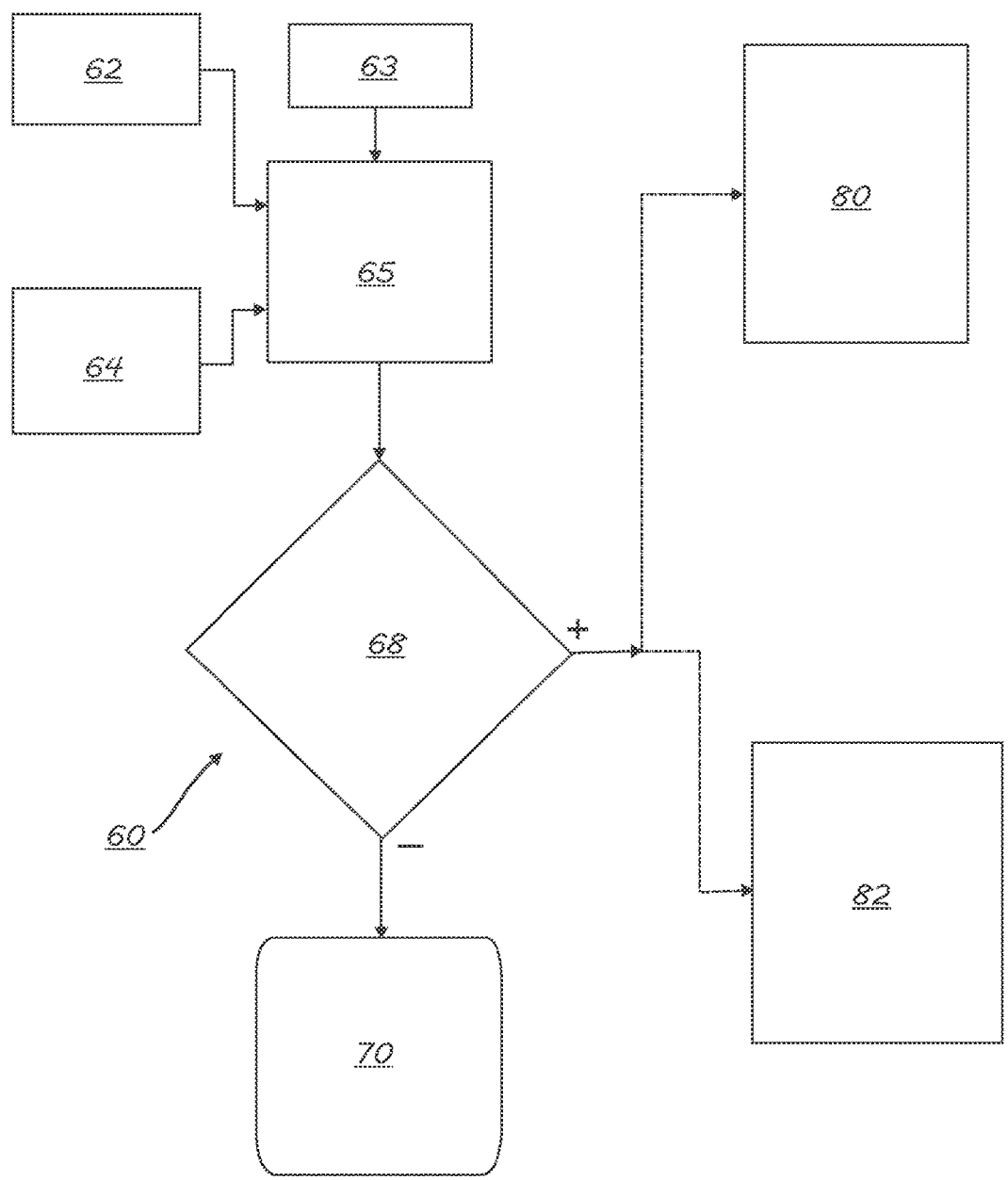
FIG. 5 illustrates a method for the use of the product according to a number of variations.

In a number of variations as illustrated in FIG. 5 as a method 60, the controller 42 may include, or may be in communication with, a clock from which it may determine the calendar date and the time of day at step 62. In addition, the controller 42 may include, or may be in communication with, a compass, GPS unit or other device from which it may determine orientation, such as directional heading of the vehicle 52 at step 64. The method 60 may proceed to step 65 where the controller 42 may determine, such as through a lookup table, the direction of the reference line 55 defined by the angles $\alpha$ and $\beta$, at which the sun is located. In a number of variations where the direction to a different light source may be determined, the method 60 may access a light sensor at step 63 from which it may determine at step 65 the direction of the reference line 55 defined by the angles $\alpha$ and beta $\beta$ at which the light source is located.

From step 65, the method 60 may proceed to step 68 where the reference line 55 determined at step 65 is compared to the field of view of the product 10. The field of view may be known from the properties of the lens 22, where on the vehicle 52 the product 10 is located, and in what direction the lens 22 is pointed. At step 68 a determination may be made as to whether the direction of the reference line 55 of the light source is within the field of view. If a negative determination is made and the light source is not within the field of view 76, then the method 60 may proceed to step 70 and the shade 28, 34, 46 respectively may remain out of the field of view 76 of the product 10 as shown in the left unshaded views 72 and 74 of FIGS. 6 and 7.

Figure 6:
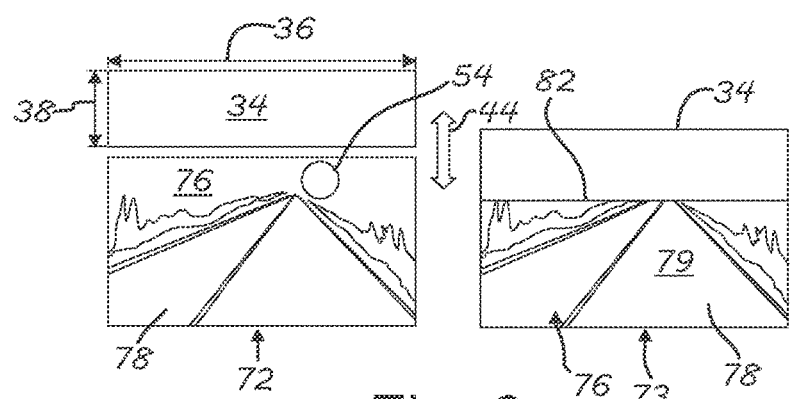
FIG. 6 illustrates a part of the product of FIG. 1 in schematic form, in use according to a number of variations.
Figure 7:
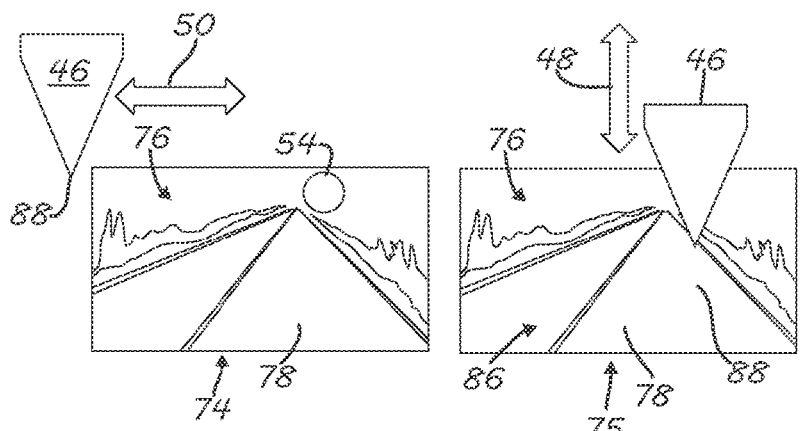
FIG. 7 illustrates a part of the product of FIG. 1 in schematic form, in use according to a number of variations.

In a number of variations the field of view 76 of the product 10 as shown in FIGS. 6 and 7 may be directed in front of the vehicle 52 and may view a roadway 78. A bright light source 54 may exist within the field of view 76. Returning to step 68 of the method 60, if a positive determination is made that the light source 54 is within the field of view 76 then the method 60 may proceed to step 80 in the case of a one-dimensional shade 34 of FIGS. 2 and 6. At step 80 the shade 34 may be moved in the bi-directional mechanical movements 44 to cover a portion of the field of view 76 to shade the light source 54. For example, the shade 34 may be moved downward (in this case), to cover a portion of the field of view 76. The shade 34 may be positioned so that the maximum elevation remaining unshaded at the top 82 of the unshaded portion 79 of the field of view 76 is lower than the reference line 55 defined by the angles α and β. As a result, the light source 54 is shaded from the field of view 76 and the product 10 may extract information from the unshaded portion 79 without oversaturation of the image sensor 12. The amount to which the bottom of the shade 34 is lower than the reference line 55 may be sufficient to cover the range 56. In other variations, the shade 34 may be lowered further so that reflections, for example as determined by a light sensor, off horizontal surfaces below the light source 54 are shaded. In other variations, the shade 34 may filter rather than block light and the product 10 may extract information from the field of view 76 without oversaturation of the image sensor 12.

Returning to step 68 of the method 60, if a positive determination is made that the light source 54 is within the field of view 76 then the method 60 may proceed to step 82 in the case of a two-dimensional shade 46 of FIGS. 3 and 7. At step 82 the shade 46 may be moved in the bi-directional mechanical movements 48 (vertical), and 50 (lateral), to cover a portion of the field of view 76 to shade the light source 54. The shade 46 may be positioned at any point in the field of view 76. For example, the shade 46 may be moved downward and to the right (in this case), to cover a portion of the field of view 76. The shade 46 may be positioned so that the tip 88 is aligned laterally with the reference line 57 defined by α. For example, the tip 88 may be placed on the line 57 oriented as a point in the field of view 76. In other situations, the reference line 57 may be above or below placement of the tip 88. The shade may be positioned vertically so that the field of view 76 is shaded around the reference line 55 defined vertically by the angle θ. As a result, the light source 54 is shaded from the field of view 76 and the product 10 may extract information from the unshaded portion 86 without oversaturation of the image sensor 12. Alternatively, the shade 46 may filter rather than block light and the product 10 may extract information from the field of view 76 without oversaturation of the image sensor 12.

Through the foregoing product 10 and method 60 a light source 54 may be shaded as shown in the right, shaded views 73 and 75 of FIGS. 6 and 7 respectively. As a result, data may be effectively obtained from the field of view 76 without interference of a bright light source 54. The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a product that may include a lens and a shade. A field of view may be defined through the lens. An actuator may selectively position the shade within the field of view.

Variation 2 may include the product according to variation 1 wherein the shade may be opaque.

Variation 3 may include the product according to variation 1 wherein the shade may be bi-directionally positioned by the actuator.

Variation 4 may include the product according to variation 1 and may include multiple actuators and wherein the shade may be positioned at any point within the field of view by the multiple actuators.

Variation 5 may include the product according to variation 1 wherein when the shade is positioned within the field of view, a portion of the field of view may remain uncovered by the shade.

Variation 6 may include the product according to variation 1 wherein the shade may include a triangular section with a tip.

Variation 7 may include the product according to variation 1 and may include an actuator ring disposed around the shade that may carry the actuator.

Variation 8 may involve a product that may include an image sensor. A lens may capture light from a field of view. The light may be focused by the lens onto the image sensor. A shade may be positioned in a front of the lens and may selectively block a portion of the field of view.

Variation 9 may include the product according to variation 8 wherein the light may include an intense light source and the shade may be positioned to block the intense light source.

Variation 10 may include the product according to variation 9 wherein the shade may include a triangular section with a tip. The tip may be positioned in the field of view in line with the intense light source.

Variation 11 may include the product according to variation 9 wherein the shade may be opaque.

Variation 12 may include the product according to variation 9 and may include an actuator. The shade may be bi-directionally positioned by the actuator.

Variation 13 may include the product according to variation 9 and may include multiple actuators. The shade may be positioned at any point within the field of view by the multiple actuators.

Variation 14 may include the product according to variation 8 wherein when the shade may be positioned within the field of view. A portion of the field of view may remain uncovered by the shade.

Variation 15 may involve a method of blocking a light source from the field of view of a camera. A shade may be provided. The direction from which the light source is directed at the camera may be determined. The shade may be positioned within the field of view and in the direction.

Variation 16 may include the method according to variation 15 and may include moving the shade multi-directionally to any point in the field of view in line with the direction.

Variation 17 may include the method according to variation 15 wherein the step of determining the direction from which the light source is directed at the camera may include determining an angle α defining a lateral direction to the light source, and determining an angle β defining a vertical direction to the light source.

Variation 18 may include the method according to variation 17 and may include positioning the shade so that a maximum elevation angle remaining in the field of view is less than β.

Variation 19 may include the method according to variation 17 and may include providing the shade with a tip, and positioning the shade so that the tip is in line with a reference line defined by α.

Variation 20 may include the method according to variation 19 and may include providing a triangular section on the shade and covering less than the entire field of view with the shade.

The above description of select variations within the scope of the invention is merely illustrative in nature and, thus, variations or variants thereof are not to be regarded as a departure from the spirit and scope of the invention.

What is claimed is:

1. A method of blocking a light source from a field of view of a camera of a vehicle comprising: providing an image sensor and a shade that blocks light from reaching the image sensor when positioned over the field of view; supplying a time, by a clock, indicative of a location of a sun, to a processor of a controller; supplying, by a compass, a directional heading of the vehicle to the processor; determining, by the processor, a direction from which the light source is directed at the camera, by comparing the time and the directional heading to location information of the sun, by referencing a lookup table which includes the direction for the time, and factoring in the directional heading; positioning, by an actuator mechanism, the shade within the field of view and in the direction by aligning the shade with the direction and moving the shade multi-directionally, by the actuator mechanism, to any point in the field of view in line with the direction; leaving, by the positioning and by dimensions of the shade, an unshaded portion of the field of view; and extracting, by the processor, information from the unshaded portion of the field of view.

2. The method according to claim 1 wherein the step of determining the direction from which the light source is directed at the camera comprises determining, by the processor, an angle $\alpha$ defining a lateral direction to the light source and determining, by the processor, an angle $\beta$ defining a vertical direction to the light source, and comprising determining dimensions of the shade by using a known range of rays of the sun around a reference line directed at the sun.

3. The method according to claim 2 further comprising positioning, by the actuator mechanism, the shade so that a maximum elevation angle remaining unshaded in the field of view is less than the angle $\beta$.

4. The method according to claim 2 further comprising providing the shade with a tip, positioning, by the actuator mechanism, the shade so that the tip is in line with a reference line defined by the angle $\alpha$.

5. The method according to claim 4 further comprising positioning the shade in a ring, and connecting multiple actuators between the ring and the shade.

* * * * *